Patented May 24, 1938

2,118,353

UNITED STATES PATENT OFFICE 2,118,353

PROCESS FOR OBTAINING MAGNESIUM OXIDE FROM DOLOMITIC ROCK

Walter H. MacIntire, Knoxville, Tenn., assignor to American Zinc, Lead & Smelting Company, St. Louis, Mo., a corporation of Maine No Drawing. Application February 15, 1937, Serial No. 125,930

8 Claims. (Cl. 23—201)

This invention relates to the production of substantially pure magnesium oxide and has for its object to obtain a product of this character from dolomitic rock, such as dolomite or dolomitic limestone, at a minimum cost.

In practicing the invention dolomite or dolomitic limestone is calcined to produce a mixture of substantially three parts $CaCO_3$ and one part MgO and a minimal amount of CaO. This soft calcine is comminuted and a cold water suspension of the three components of the mixture is then formed. The suspension is first made by the addition to the calcine of about one-fourth of the final volume of added water to effect hydration of the MgO of the calcine. The hydration may be accomplished by aging the suspension but preferably is expedited by application of heat. The remaining three-fourths of the full quantity of water is then added, the preferred final ratio of calcine to water being within the range of 1 to 16 and 1 to 20. Such a suspension has practically no solvent action on the carbonate and MgO solids which are merely held in suspension in the cold water. Into this suspension hydrogen sulfide gas ($H_2S$) is injected. The hydrogen sulfide gas combines with the hydrated MgO in suspension to produce a cold solution of $MgH_2S_2$, the $CaCO_3$ remaining as a solid suspended in this solution of $MgH_2S_2$. This cold solution of $MgH_2S_2$ is then separated from the inert calcium carbonate ($CaCO_3$) by filtration, centrifuging or otherwise and a clarified cold water solution of $MgH_2S_2$ is obtained. This clarified solution is then heated to the boiling point, preferably by first injecting steam into the solution and then applying extraneous heat in any suitable way. This heat causes the $MgH_2S_2$ solution to break down into solid hydrated magnesia ($Mg(OH)_2$) and the gas, $H_2S$. The heating of the solution is carried on in a closed chamber, to the complete evolution of $H_2S$ so that this $H_2S$ gas is recovered for use in repeating the operation.

As thus far described, the small amount of caustic, or "free" lime in the calcine mixture has been ignored, and the final MgO product, while being of high quality, is not absolutely pure, since the free lime would also react with and be dissolved by the injected gas, $H_2S$, and the resultant hydrated MgO product would be contaminated thereby. To produce pure MgO the small "free" lime content of the calcine mixture (MgO, $CaCO_3$ and some CaO), is eliminated from the cold water suspension before injection of the $H_2S$ gas. This elimination of active or "free" CaO may be effected in any suitable way, as by injection of a small amount of carbon dioxide gas to convert the CaO to calcium carbonate ($CaCO_3$), or by the addition of the requisite amount of magnesium sulfate to convert the CaO to calcium sulfate ($CaSO_4$). Or any other appropriate means for eliminating the lime (CaO) may be employed.

After the "free" lime content has been converted to either calcium carbonate or sulfate in the suspension, $H_2S$ gas is injected into this lime-free cold suspension until the $H_2S$ gas comes to a pseudoequilibrium with the cold suspension, at which point about 80%–90% of the MgO content of the suspension will be found to have entered into solution. When this point is reached, if there is further injection of the $H_2S$ gas, said gas will pass on through the suspension, without being absorbed. When the point is reached where no further absorption of $H_2S$ gas takes place, the solution is permitted to stand for a few hours, say over night, after which additional $H_2S$ gas is injected until no more will be absorbed. This results in a practically complete solution of the MgO content of the calcine in the suspension. When such practically complete solution of the initial MgO content of the calcine has been secured, the solution is clarified as above described and then subjected to heating, and it breaks down into substantially pure solid hydrated magnesia ($Mg(OH)_2$) and $H_2S$ gas, the gas being recovered and held ready for use in repeating the operation.

The resultant precipitate, after filtration or centrifuging, may then be dried and lightly calcined in a single operation to convert the hydrated oxide, $Mg(OH)_2$ to the oxide, MgO.

Having thus described the invention, what is claimed is:

1. A process which consists in forming a cold water suspension of a comminuted dolomitic calcine comprising $CaCO_3$ and MgO, permitting hydration of the suspended MgO to ensue, then bringing the hydrated MgO content of the calcine into solution by injecting hydrogen sulfide gas into the suspension, clarifying the solution and boiling the clarified solution.

2. A process which consists in forming a cold water suspension of a comminuted dolomitic calcine comprising $CaCO_3$ and MgO, permitting hydration of the suspended MgO to ensue; subjecting the hydrated magnesium oxide in the suspension to treatment with $H_2S$ to cause the $Mg(OH)_2$ to pass into solution in the cold hydrogen-sulfide-impregnated water, clarifying the solution and heating the clarified solution to precipitate hydrated magnesium oxide, and converting the $Mg(OH)_2$ to MgO by heat.

3. A process which consists in forming a cold water suspension of a comminuted dolomitic calcine comprising $CaCO_3$ and MgO, permitting hydration of the suspended MgO to ensue, eliminating the CaO content of the calcine from the suspension, subjecting the hydrated magnesium oxide in the suspension to treatment with $H_2S$ to cause the $Mg(OH)_2$ to pass into solution in the cold hydrogen-sulfide-impregnated water, clarifying the solution and heating it to precipitate hydrated magnesium oxide, and converting the $Mg(OH)_2$ to MgO by heat.

4. A process which consists in forming a cold water suspension of a comminuted dolomitic calcine comprising $CaCO_3$ and MgO, permitting hydration of the suspended MgO to ensue, converting any "free" lime (CaO) in the suspension to calcium carbonate, ($CaCO_3$), then injecting hydrogen sulfide gas ($H_2S$) into the suspension, whereby the hydrated magnesium oxide ($Mg(OH)_2$) in the suspension is brought into solution in the cold hydrogen-sulfide-impregnated water, clarifying the solution by removing solids therefrom, then heating the clarified solution and collecting the resultant hydrated magnesium oxide and hydrogen sulfide gas, and converting the $Mg(OH)_2$ to MgO by heat.

5. A process which consists in forming a cold water suspension of a comminuted dolomitic calcine comprising $CaCO_3$ and MgO, permitting hydration of the suspended MgO to ensue, converting any "free" lime (CaO) in the suspension to calcium sulfate ($CaSO_4$), then injecting hydrogen sulfide gas ($H_2S$) into the suspension, whereby the hydrated magnesium oxide ($Mg(OH)_2$) in the suspension is brought into solution in the cold hydrogen-sulfide-impregnated water, clarifying the solution by removing solids therefrom, then heating the clarified solution and collecting the resultant hydrated magnesium oxide and hydrogen sulfide gas and converting the $Mg(OH)_2$ to MgO by heat.

6. A process which consists in forming a cold water suspension of a comminuted dolomitic calcine comprising $CaCO_3$ and MgO, permitting hydration of the suspended MgO to ensue, eliminating any free lime from the suspension, then injecting hydrogen sulfide gas ($H_2S$) into the suspension until no more of the injected gas is absorbed thereby, then permitting the suspension to stand for a short period of time, then again injecting hydrogen sulfide gas into the suspension, whereby the hydrated magnesium oxide ($Mg(OH)_2$) in the suspension is dissolved in the cold hydrogen-sulfide-impregnated water, clarifying the solution by removing solids therefrom, and then boiling the clarified solution and collecting the resultant hydrated magnesium oxide and hydrogen sulfide gas and lightly calcining the $Mg(OH)_2$ to produce MgO.

7. A process which consists in forming a cold water suspension of a comminuted dolomitic calcine comprising $CaCO_3$ and MgO, permitting hydration of the suspended MgO to ensue, converting any free lime of the suspension into calcium carbonate, injecting hydrogen sulfide gas into the suspension, whereby a cold solution of $MgH_2S_2$ is formed with calcium carbonate as a solid suspended therein, eliminating the calcium carbonate from the $MgH_2S_2$ solution, then boiling the solution, collecting the resultant hydrated magnesium oxide and the hydrogen sulfide gas and lightly calcining the recovered $Mg(OH)_2$ to produce MgO.

8. The process of obtaining an approximately pure magnesium oxide which consists in forming in cold water a suspension of dolomitic calcine comprising $CaCO_3$ and MgO by first adding to the calcine only approximately enough cold water to hydrate the MgO and then adding enough cold water to complete the suspension, then subjecting the hydrated magnesium oxide of the calcine suspension to treatment with $H_2S$ to cause the $Mg(OH)_2$ to pass into solution in the cold hydrogen-sulfide-impregnated water, clarifying the solution and heating it to precipitate hydrated magnesium oxide, and converting the $Mg(OH)_2$ to MgO by heat.

WALTER H. MacINTIRE.